United States Patent [19]

Engeler et al.

[11] 3,921,194

[45] Nov. 18, 1975

[54] METHOD AND APPARATUS FOR STORING AND TRANSFERRING INFORMATION

[75] Inventors: William E. Engeler, Scotia; Jerome J. Tiemann, Schenectady, both of N.Y.

[73] Assignee: General Electric Company, Schenectady, N.Y.

[22] Filed: July 13, 1973

[21] Appl. No.: 378,819

Related U.S. Application Data

[63] Continuation of Ser. No. 56,353, July 20, 1970, abandoned.

[52] U.S. Cl. ...................... 357/24; 357/54; 357/59; 357/68; 357/71

[51] Int. Cl.$^2$ .................... H01L 27/10; H01L 29/78

[58] Field of Search ........... 357/24; 307/221 D, 304

[56] References Cited

UNITED STATES PATENTS 3,621,279 11/1971 Jen et al. ............................ 357/24

3,651,349 3/1972 Kahng et al. ........................... 357/24

*Primary Examiner*—William D. Larkins

*Attorney, Agent, or Firm*—Julius J. Zaskalicky; Joseph T. Cohen; Jerome C. Squillaro

[57] ABSTRACT

A method and apparatus for storing and transferring information employing a conductor-insulator-semiconductor (CIS) structure as the storage and transfer apparatus is disclosed herein. The CIS structure is initially charged to a predetermined voltage thereby forming a depletion region within the semiconductor beneath the insulated conductor. Minority carriers controllably generated within the semiconductor are stored at the surface of the semiconductor beneath the insulated conductor by an electric field existing in the depletion region, thus changing the predetermined voltage. Means for transferring the stored charge along the surface of the semiconductor are disclosed.

11 Claims, 11 Drawing Figures

INVENTORS:
WILLIAM E. ENGELER;
JEROME J. TIEMANN,
by Jerome C. Squillaro
THEIR ATTORNEY INVENTORS:
WILLIAM E. ENGELER,
JEROME J. TIEMANN,
by [signature]
THEIR ATTORNEY INVENTORS:
WILLIAM E. ENGELER;
JEROME J. TIEMANN,
by Jerome C. Squillaro
THEIR ATTORNEY INVENTORS:
WILLIAM E. ENGELER;
JEROME J. TIEMANN,
by Jerome C. Squillaro
THEIR ATTORNEY

METHOD AND APPARATUS FOR STORING AND TRANSFERRING INFORMATION

This is a continuation of application Ser. No. 56,353, filed July 20, 1970, now abandoned.

The present invention relates to methods and devices which store and transfer information between storage elements. This application is related to copending applications Ser. No. 792,488 and 792,569 of William E. Engeler and Marvin Garfinkel filed Jan. 21, 1969, and of common assignee.

The importance of information storage and handling devices has prompted the development of numerous devices and methods for storing, displaying and performing logic functions. The continued requirements for smaller, more reliable and higher density storage devices has motivated researchers to develop a conductor-insulator-semiconductor (CIS) structure as a basic storage element. Basically, the CIS structure employs a semiconductor material selected to have a time constant for the generation of minority carriers which is large compared to the information storage interval. Overlying the semiconductor material is an insulating layer with a conductor member thereover. When the CIS structure is charged to a predetermined voltage, a depletion region forms in the semiconductor below the conductor member. Minority carriers are generated within the semiconductor in controled response to incoming information, either from electromatic radiation, though an injecting contact or other means. The minority carriers are stored at the surface of the semiconductor material beneath the conductor member. The predetermined voltage which produced the depletion region is changed to a new value by the presence of the stored minority carriers at the insulator-semiconductor interface. The change in voltage is therefore one measure of the minority carriers stored by the capacitive element and is representative of the information signal stored. Thus as is disclosed, interalia, in the aforementioned application, Ser. No. 792,569, the stored information may be used to provide an electrical readout. Alternately, as disclosed, interalia, in application, Ser. No. 792,488, the information may be used to provide an optical readout. Other means for detecting the presence of this charge may also be used.

By arranging a plurality of capacitive elements in closely spaced relationship, it is possible to transfer the charge from one element to another and hence in addition to providing memory function, it is possible to provide information processing and logic functions such as would be encountered in shift registers, delay lines, imaging and display systems and numerous other information handling function.

It is therefore an object of the present invention to provide a method and apparatus for high density, high speed storage and transfer of information.

Another object of the invention is to provide a method of making high density arrays of conductor-insulator-semiconductor storage elements.

Yet another object of the invention is to provide a novel method and apparatus for interconnecting a plurality of capacitive storage elements.

Briefly, and in accord with one embodiment of our present invention, a conductor-insulator-semiconductor structure (CIS) is utilized to store information. The semiconductor material is selected, doped and utilized in such a manner that the time constants involved in the generation of minority carriers by the material are large compared to the information storage interval. Thus, when the CIS structure is charged to a predetermined voltage which influences the potential of the semiconductor at its surface, a depletion region forms in the semiconductor below the conductor. Minority carriers generated within the semiconductor, in controlled response to incoming information are swept to and stored at the surface of the semiconductor material beneath the conductor. The surface potential is changed to a new value by the presence of the minority carriers at the insulator-semiconductor interface. The electrical charge stored in one storage element in this manner may be transferred to an adjacent storage element by a novel arrangement of superposed conductor members overlying an insulating layer. By applying appropriate signals to the conductor members, the stored voltage or charge of one storage element can be transferred to another storage element. A novel means for changing the direction of charge transfer permits high density information handling devices to be fabricated. Thus by arranging the storage elements in an array of rows and columns, the novel superposed arrangement of conductor members enables the transfer of stored charge from storage elements in one row or column to be shifted in an opposite direction from those of an adjacent row or column.

The novel features believed characteristic of the present invention are set forth in the appended claims. The invention itself, together with further objects and advantages thereof, may be best understood by reference to the following detailed description taken in connection with the accompanying drawing in which:

Figure 7:
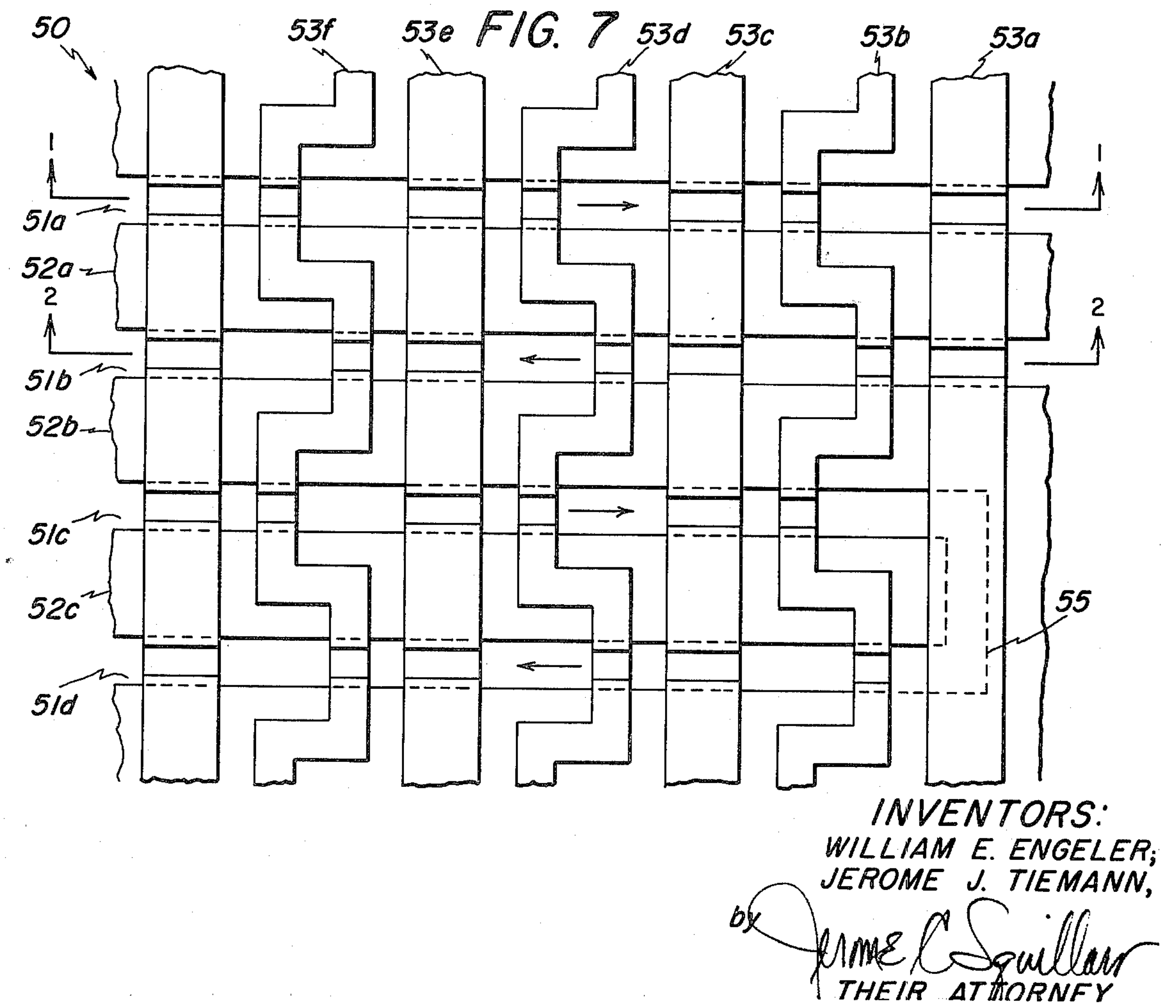
Figure 8:
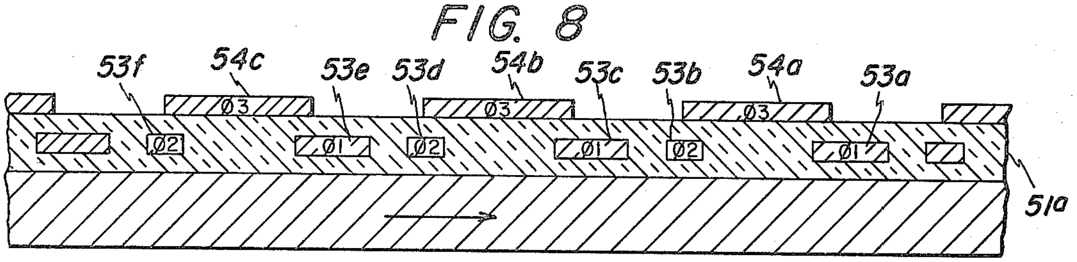
Figure 9:
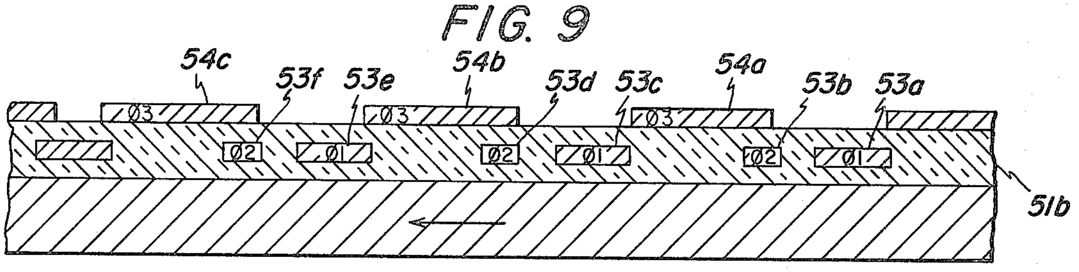
Figure 10:
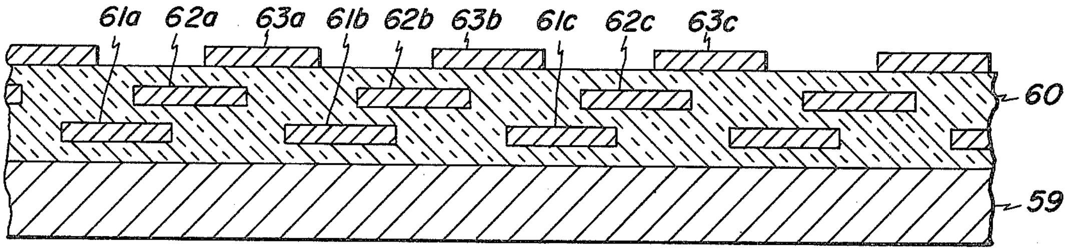
Figure 11:
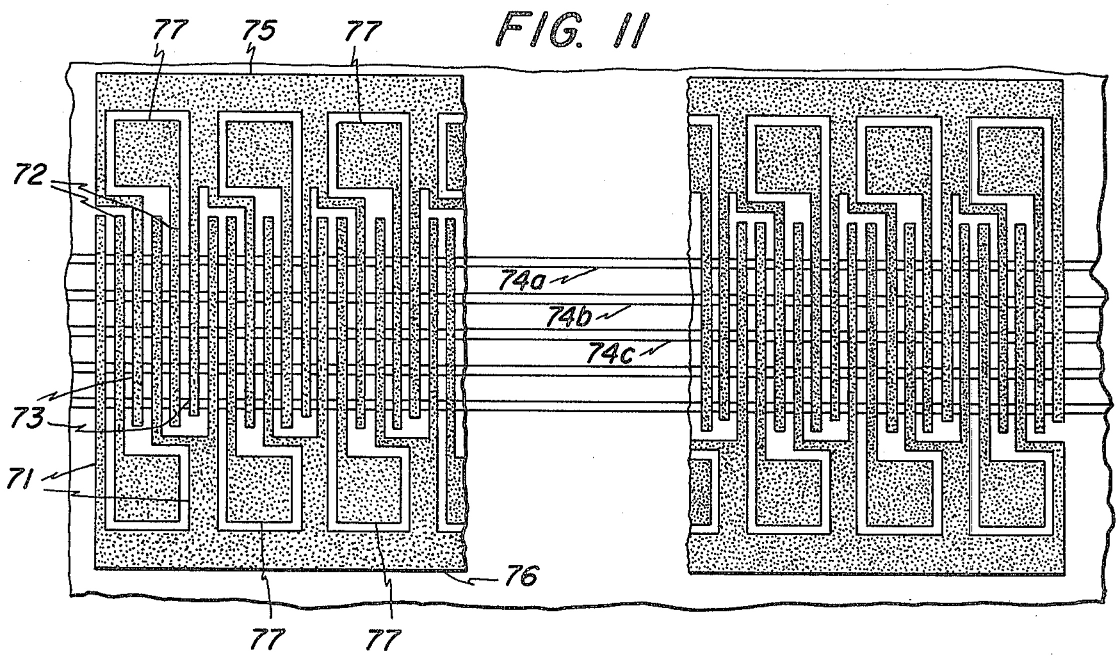

FIG. 7 is a partial plan view of yet another embodiment of our invention illustrating another arrangement of conductor members FIGS. 8 and 9 are cross-sectional views taken along lines 1—1 and 2—2, respectively, of FIG. 7;

FIG. 10 is a partial cross-sectional view of an embodiment of our invention employing three layers of overlapping conductor members; and FIG. 11 is a partial plan view of yet another embodiment of our invention wherein a single layer of interdigitated conductor members are interconnected by alternately positioned electrical crossover devices.

Figure 1:
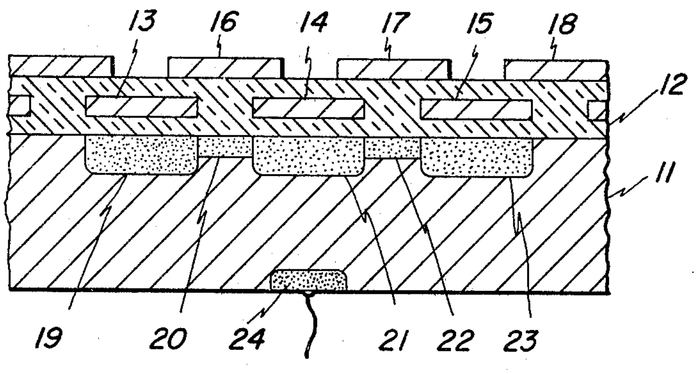
FIG. 1 illustrates a partial cross-sectional view of an embodiment of our invention.

By way of example of an embodiment of our invention and for ease of description of the theory of operation relating thereto, reference is made fo FIG. 1 of the drawing wherein a substrate 11 of p-type semiconductor material, such as silicon, for example, is provided with an insulator layer 12 thereover. Overlying the insulator 12 are a plurality of conductor members 13, 14 and 15. These conductor members may, for example, be square or rectangular shaped conductive regions. Insulatingly overlying conductors 13, 14 and 15 and in overlapping relationship therewith, are conductors 16, 17 and 18. Conductor members 16, 17 and 18 may, for example, have similar dimensions to those of conductor members 13, 14 and 15.

In accord with the simplified embodiment of our invention illustrated in FIG. 1, the storage and transfer of information is achieved in the following manner. By applying a positive bias voltage $V_0$ to conductor 13, for example, a depletion region 19 forms in the semiconductor substrate 11, which in this instance is assumed to be p-type, beneath the conductor member 13. By choosing the proper concentration of impurity centers and the magnitude of the bias voltage, an effective depletion depth may be obtained which precludes a significant rate of arrival of minority carriers due to tunnelling and avalanche multiplication at the surface of the semiconductor substrate 11 in the regions immediately underlying the conductor member 13. Since the depletion region also collects minority carriers existing in the semiconductor due to normal thermal generation-recombination processes, the depletion region is preferably made sufficiently short in a semiconductor exhibiting low thermal generation rates so that the rate of minority carrier arrival at the surface of the semiconductor substrate 11 is reduced to a nominal value. For the case of silicon, for example, at room temperature, we have found that a storage time interval in the order of milliseconds and longer may be achieved before equilibrium through thermal generation is reached for the depletion region depths employed herein. Therefore, by insuring that no other source of minority carriers is present, after forming a depletion region 19 and removing or isolating the applied bias from the conductor member 13, minority carriers may be controllably generated or introduced externally, such as, for example, by electromagnetic radiation, injection from a point contact or a P-N junction. For purposes of illustration only, FIG. 1 illustrates the use of a P-N junction 24. By whatever means employed for generation, these minority carriers may be stored within the depletion region formed by the bias voltage. The number of minority carriers introduced into the semicondcutor, and stored under the conductor member 13, changes the potential at the surface of the semiconductor material 11 beneath the conductor member 13. This change in surface potential, due to the presence of minority carriers at the surface of the semiconductor 11, is a measure of the number of minority carriers introduced into the semiconductor and stored at the surface beneath the conductor member. Minority carriers formed under the conductor member effect a change in voltage thereon which is an indication of the stored charge at the semiconductor interface.

As described above, it is known that it is useful for information processing and storage purposes to move stored information from one location to another. In accord with the embodiment of our invention illustrated in FIG. 1, the information stored under the conductor member 13 in the form of a surface charge can be transferred to a different location on the semiconductor surface by the selective application of voltages to other conductor members overlying the semiconductor. For example, the surface charge appearing at the semiconductor surface underlying conductor member 13 can be transferred to the next adjacent conductor 16. This may be achieved by applying a potential to conductor 16 such that a depletion region 20 forms under the conductor member 16 intermediate conductor members 13 and 14. When sufficient depletion is formed, part of the charge stored under conductor member 13 shifts to region 20. The total charge is shared between these surface regions in response to the capacity of the individual storage elements and the applied voltage. No additional potential barrier exists between the elements so that charge need not be thermally activated when moving from one element to another. Instead the charge is rapidly shifted in response to the difference in surface potentials. The charge is therefore shifted by an electric field and moves in accord with its surface mobility rather than by the substantially slower process of thermal diffusion. When the voltage is removed from conductor member 13 while a voltage is still applied to conductor member 16 the remaining charge stored under conductor member 13 moves or transfers to the depletion region underlying conductor member 16. Since there are no adjacent voltage fields in the vicinity of the depletion region 19, except for the depletion region 20, all charge previously stored in the depletion region 19 transfers to the depletion region 20, thereby effecting a transfer of charge from one location to another on the semiconductor substrate.

In a similar manner, the charge may be transferred to other locations along the interface between the semiconductor and insulator layer 12. For example, by the application of a voltage to conductor member 14, a depletion region 21 is formed thereunder and the charge underlying conductor member 16 is transferred to the depletion region 21 by the removal or termination of the voltage from conductor member 16. The ability to rapidly transfer surface charge from one location to another on a semiconductor substrate can therefore be readily achieved in the aforementioned manner.

After information in the form of stored charge has been shifted from the depletion region 19 under conductor member 13 to the depletion region 21 under the conductor member 14, new charge may be shifted under conductor member 13 in response to additional information. This charge may then be shifted to the depletion region 21 under conductor member 14 after that charge is shifted to the depletion region 23 under conductor member 15. Yet another charge may be shifted under conductor member 13 and then transferred in a similar manner. It is therefore readily apparent that this method of introducing charge and transferring it can be used for the orderly storage and transfer of information signals.

Figure 2:
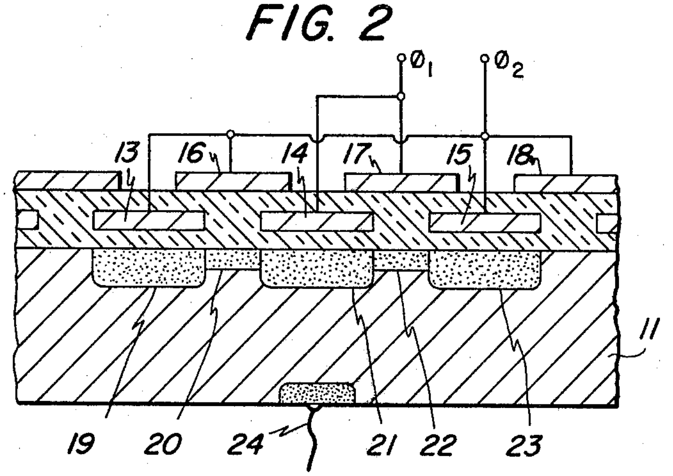
FIG. 2 is a partial cross-sectional view similar to FIG. 1 in which the conductor members are interconnected in a specific manner.

FIG. 2 illustrates a particulary useful method of interconnecting the conductor members illustrated in FIG. 1 such that the transfer of surface charge is from right to left in the drawing. As illustrated, conductor members 14 and 17 connected together to form a first group and conductor members 13, 15, 16 and 18 are connected together to form a second group. By employing two signals of like frequency but of generally opposite phase relationship, respectively connected to the first and second group of conductor members, it is possible to transfer stored charge from one location to another on the semiconductor substrate. A better understanding of how surface charge is transferred from one location to another can be had by considering the following example when taken in connection with FIG. 3.

Figure 3:
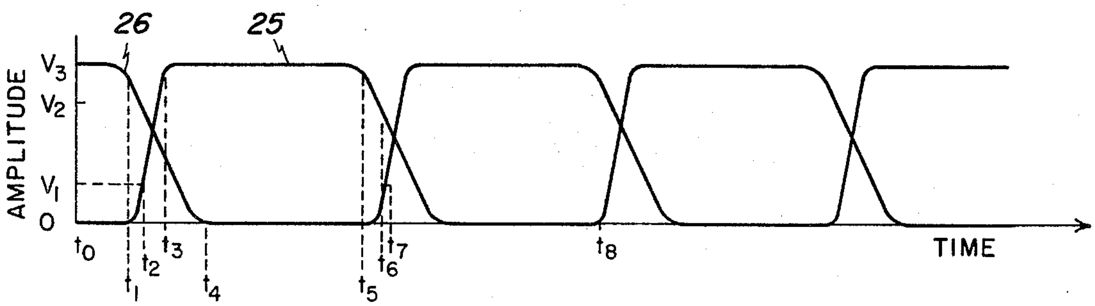
FIG. 3 is a voltage-versus-time diagram of voltage signals useful in the operation of the embodiment illustrated in FIG. 2.

FIG. 3 illustrates typical wave forms for a two-phase voltage system for transferring surface charges in the embodiment of FIG. 2. More specifically, FIG. 3 illustrates two amplitude-versus-time wave forms in which a first wave form 25 is of 0 voltage at time $t_0$ and increases to a voltage $V_1$ at time $t_2$, and then rapidly to a final voltage $V_3$ at a time $t_3$. This voltage condition continues until a time $t_5$ and then the wave form reverts to a 0 voltage condition until a time $t_8$ , and then it repeats itself periodically. The second wave form 26 is substantially 180 electrical degrees out of phase with the wave shape 25 and begins at the voltage $V_3$ at time $t_0$ and decreases to $V_2$ at time $t_2$ and eventually reaches a 0 voltage condition at time $t_4$ where it remains until time $t_5$ when it rapidly returns to the voltage $V_3$. If a voltage source producing wave forms substantially similar to those illustrated in FIG. 3 is connected to the transfer and storage apparatus illustrated in FIG. 2, such that the wave shape 25 is connected to the $\phi_1$ input and wave shape 26 is connected to the $\phi_2$ input, the following sequence of events occurs.

If at time $t_0$, no surface charges are present in the substrate 11, then with the wave shape 25 going from 0 volts to $V_1$ at time $t_2$, the depletion region 21 is formed under the conductor member 14. As the voltage increases to $V_2$, the depletion region 22 forms under conductor member 17. As the voltage continues to increase to $V_3$, the depths of the depletion regions increase slightly and remain at this magnitude so long as the voltage remains substantially the same. If during this time period between $t_3$ and $t_5$ minority carriers are introduced into the semiconductor substrate (e.g., by point contact, P-N junction, etc.), these carriers are collected within the depletion regions 21 and 22. As the wave shape 25 begins to switch from $V_3$ to $V_2$ between $t_5$ and $t_6$, the wave shape 26 begins to switch from $V_0$ to $V_1$. During this time the surface charge stored within the depletion region 22 begins to move toward the depletion region 21 and eventually as the wave shape 25 falls below the voltage $V_2$ at time $t_6$, all charge is stored within the depletion region 21. As the wave shape 25 continues to decrease in magnitude, the wave shape 26 continues to increase in magnitude and as the wave shape 26 exceeds the voltage $V_1$ at $t_7$, depletion region 19 is formed. As the wave shape 26 continues to increase in magnitude to the voltage $V_2$, the depletion region 20 is formed. As the depletion regions 19 and 20 are formed, a portion of the surface charge existing within the depletion region 21 is transferred to these depletion regions. Eventually, as the wave shape 25 falls below $V_1$ and the wave shape 26 is at $V_3$ volts, the remainder of the surface charge stored in the depletion region 21 is transferred to the depletion regions 19 and 20. As the wave shape 26 switches from its voltage level $V_3$ to its voltage level of 0, the wave shape 25 switches from 0 to $V_3$ and hence the charge stored within the depletion regions 19 and 20 are shifted solely to the depletion region 19 and eventually to the next adjacent depletion region formed under the conductor member 16. This cycle of operation repeats with the frequency of the wave shapes 25 and 26.

In the event that no surface charge is introduced into the substrate, the depletion regions are merely formed and destroyed as the voltage signals switch between the two levels of operation. Additionally, in the event that more than one surface charge is introduced into the semiconductor substrate, these charges will be transferred along the surface of the substrate in substantially the same order in which they are introduced into the substrate. For example, if the presence of a surface charge represents a logic 1 condition and the absence of a surface charge represents a logic 0 condition, then a digital word such as 1101, once introduced into the semiconductor substrate, is transferred along the surface thereof in the same logic relationship.

By way of further illustration and description of our invention, a ten-bit shift register may be fabricated on a silicon surface of n-type conductivity with a resistivity of 4-ohm centimeters and a crystal orientation in accord with the Miller indices of (1,1,1). A 1000 Angstroms thick insulator layer, for example, such as thermally grown silicon dioxide, for example, is formed over the surface of the silicon and a layer of a conductive material such as molybdenum, for example, having a thickness of 3000 A., for example, is formed over the insulator layer. The molybdenum layer is photolithographically masked and etched to produce discrete conductor members of 0.4 millimeters square spaced from each other by 0.4 millimeters. A 1000 A. thick layer of silicon dioxide, for example, is next deposited over the etched molybdenum members and another layer of molybdenum is deposited thereover. The second layer of molybdenum is photolithographically masked and etched so as to provide conductive members having substantially similar dimensions to that of the first layer but in overlapping relationship with the first layer. A final thicker layer of insulating material, such as silicon dioxide, for example, is next deposited over the entire structure to a thickness of one micron, for example. Contacts are made to the molybdenum members by etching holes through the insulating material and depositing an aluminum layer thereover. The aluminum layer is then patterned and etched in accord with the interconnections described above. The magnitude of the voltage necessary to produce a depletion region under the first layer of conductive members is approximately −2.5 volts whereas approximately −5.0 volts is necessary for the second layer of conductive members. By employing voltage signals of approximately −10 volts, reliable transfer of surface charge is attained.

From the foregoing descriptions of embodiments of our invention, those skilled in the art can readily appreciate that the storage and transfer of surface charge from one location to another on a semiconductor substrate can be used for various digital and analog functions. While the aforementioned embodiments of our invention can be adapted to perform numerous digital and analog functions, from the standpoint of providing high density and economy of fabrication of large numbers of storage elements, several preferred embodiments of our invention are discussed below.

Figure 4:
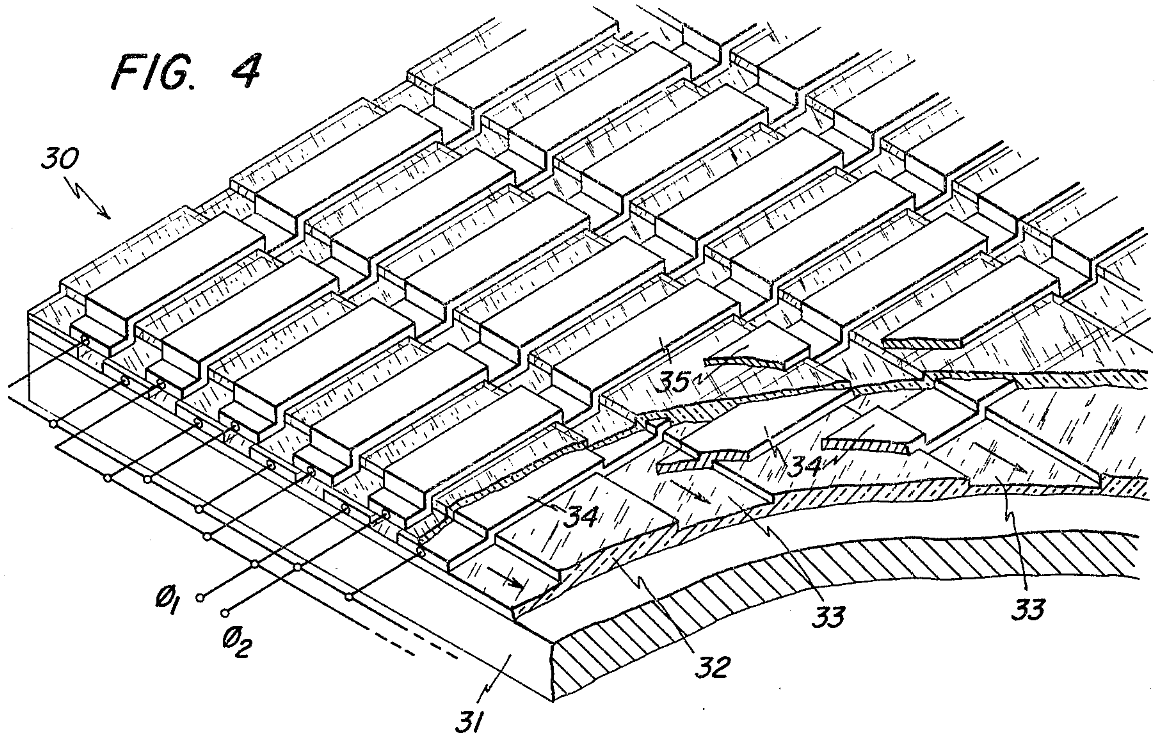
FIG. 4 is a partial perspective view, partially broken away, of information processing apparatus in accord with another embodiment of our invention.

Referring particularly to FIG. 4 of the drawing, a partial perspective view of information processing apparatus 30 such as a shift register is illustrated. The processing apparatus 30 includes a substrate 31 of semiconductor material with an insulator layer 32 formed thereover. The insulator layer 32 has a plurality of relatively thin channel regions 33 formed in the relatively thick insulator layer. The channel regions 33 are illustrated as being substantially equidistant from and parallel to each other. By way of example, the substrate 31 may comprise p-type silicon with a thermally grown silicon dioxide layer thereover. The thickness of the insulator layer 32 in the channel regions 33 may, for example, be 1000 A. with the remainder of the insulator layer having a thickness in excess of approximately 10,000 A., for example. The channel regions 33 function as information storage channels in a manner described hereinafter.

The information processing apparatus 30 further includes a first plurality of conductor members 34 which overlie the insulator layer 32 and transversely intersect the relatively thick and relatively thin regions thereof. The conductor members 34 may, for example, be formed by depositing a conductive material over the insulator layer and photolithographically masking and etching the layer to produce the plurality of conductor members 34. While refractory metals such as molybdenum and tungsten may be utilized with advantage, other conductive materials such as silicon, aluminum and other useful materials may also be employed for the conductive members 34, as desired. A second plurality of conductor members 35 insulatingly overlie the first plurality of conductor members 34. The second plurality of conductor members are formed in substantially the same manner as the first plurality of conductor members but are arranged so that one conductor member in the second plurality overlaps adjacent conductors in the first plurality of conductors. The second plurality of conductor members may advantageously be a different material than the conductive members 34. For example, conductor members 34 may be molybdenum while conductor members 35 may be aluminum or a composition of molybdenum and gold. This structural arrangement of conductors is conveniently provided, for example, by depositing an insulating layer of silicon dioxide, for example, over the first plurality of conductor members and depositing thereover a conductive material, such as one selected from the aforementioned group. The second plurality of conductors is then formed by photolithographically masking and etching the deposited conductive material so as to produce the pattern of conductor members illustrated in the drawing.

The information processing apparatus 30 provides storage and transfer of surface charge from left to right along each information storage channel 33 by interconnecting the first and second plurality of conductor members in the manner illustrated in the drawing. Since the first and second plurality of conductor members are connected to the same clocking signals, all surface charges stored in the channel regions are moved along at the same rate and maintain the same relative positional relationship with all other stored surface charges as they are transferred along the semiconductor substrate. Surface charges can be transferred in the opposite direction by interconnecting the conductor members as illustrated in FIG. 2. Means for introducing and extracting surface charges from the semiconductor substrate such as point contacts, P-N junctions and electromagnetic radiation may be employed if desired. The details of such means are more fully described in the aforementioned copending applications.

Figure 5:
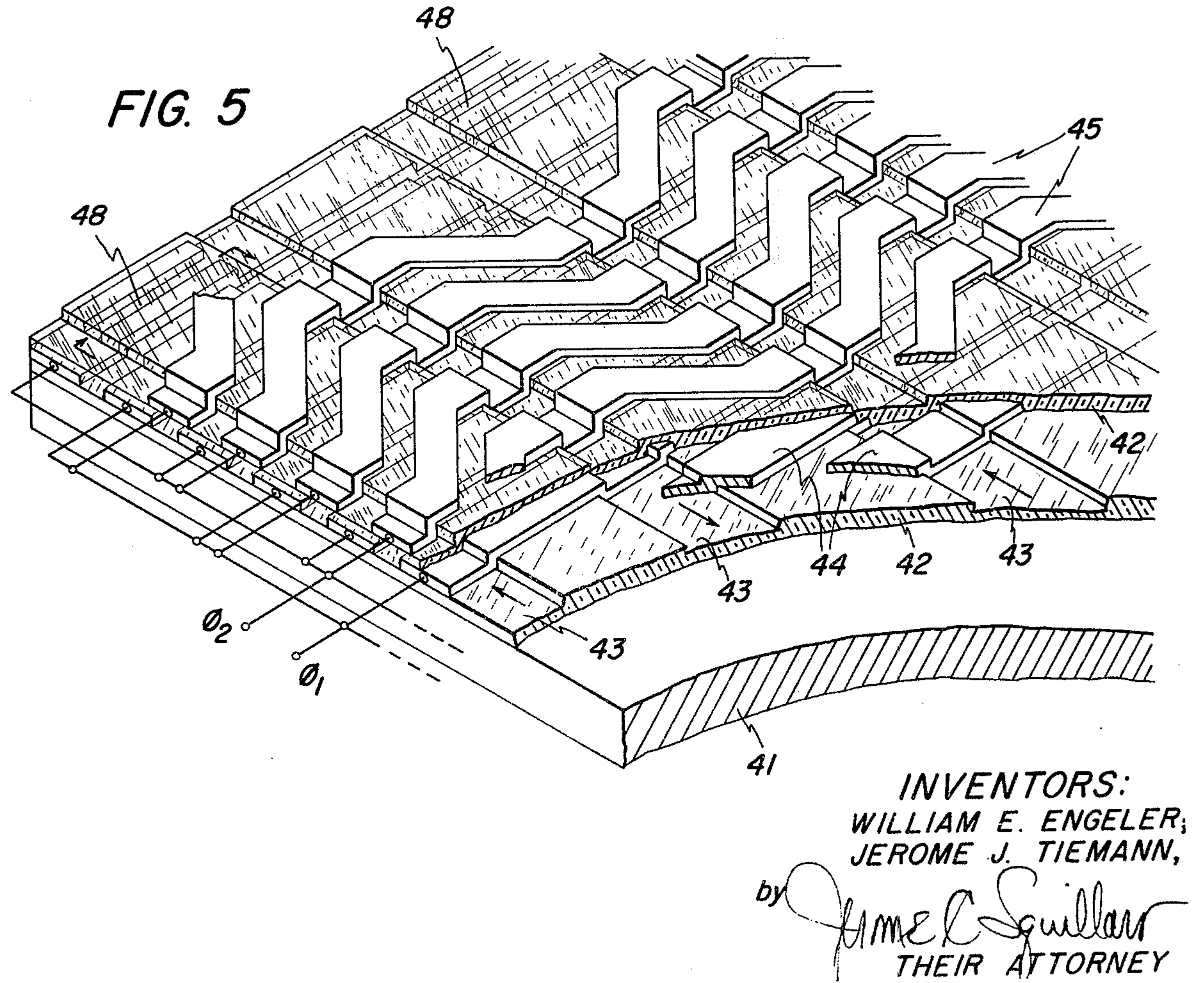
FIG. 5 is a partial perspective view, partially broken away, of information processing apparatus in accord with yet another embodiment of our invention.

While the embodiment of our invention illustrated in FIG. 4 has numerous advantages over the embodiment illustrated in FIG. 2, nonetheless, to provide still higher density arrays and longer channel regions through which surface charges may be stored and transferred, certain changes and modifications to the structure of FIG. 4 are desirable. For example, since the physical size of a semiconductor substrate is limited by the methods of making semiconductor substrates, the length of a straight channel region, for example, is limited. Although curved or circular patterns may be employed to extend the length of a channel region, these do not provide for the most efficient use of the semiconductor material. Hence, the storage density is not optimized. When, on the other hand, the embodiment illustrated in FIG. 4 is provided with a means for causing surface charges to be transferred in one direction along one channel region and in an opposite direction in another channel region and means for interconnecting the channel regions so that charges may be transferred between channel regions, a high density storage and transfer apparatus is provided. FIG. 5 illustrates such an arrangement wherein both objectives are satisfied.

FIG. 5 is a partial perspective view of another embodiment of our invention in which a semiconductor substrate 41 is covered with an insulating layer 42 having channel regions 43 formed therein. Overlying the insulator layer 42 and positioned substantially transversely to the channel regions are a plurality of conductor members 44, substantially similar to those described above with reference to FIG. 4. A second plurality of conductor members 45 are insulatingly disposed over the first plurality of conductor members and overlap adjacent conductor members at least within the narrow channel regions 43. The conductor members 45 form a serpentine pattern in which each of the conductors overlaps adjacent conductors of the first plurality in the narrow channel region and overlaps diagonally adjacent conductor members of the first plurality in the next-adjacent channel region. As illustrated in FIG. 5, the serpentine pattern of conductors 45 next overlap the first adjacent pair of conductor members in the next-adjacent channel region. The serpentine pattern of conductor members 45 is more clearly illustrated in FIG. 6 of the drawing.

Figure 6:
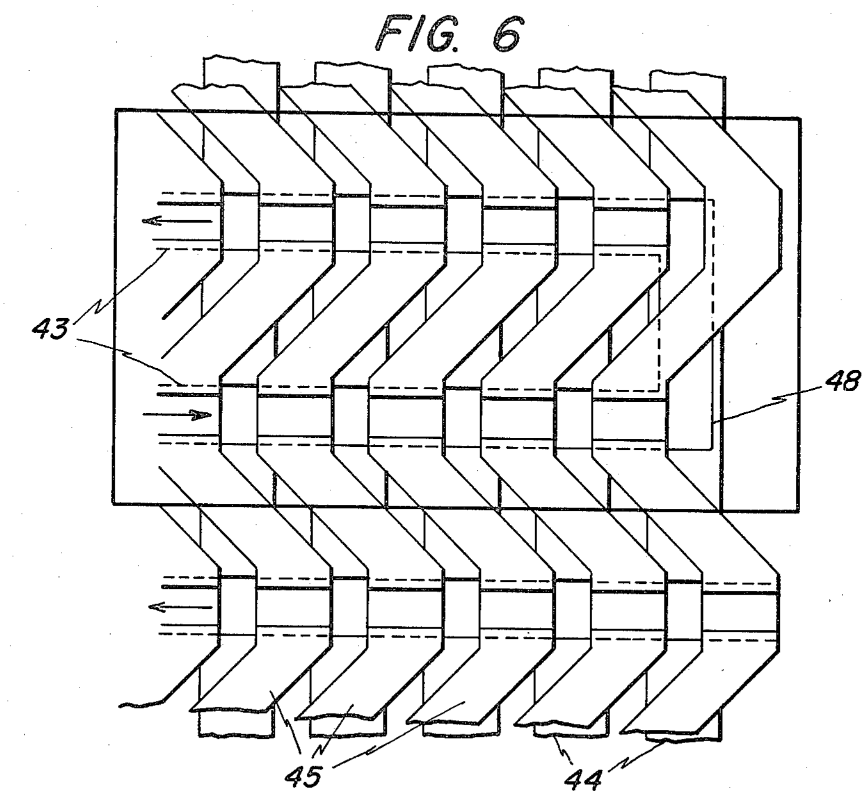
FIG. 6 is a pratial plan view of the embodiment of our invention illustrated in FIG. 5.

FIG. 6 is a partial plan view of the embodiment of FIG. 5 in which the overlapping relationship of the first plurality of conductors and the second plurality of conductors is more clearly illustrated. FIG. 6 also illustrates an interconnecting channel region 48 between adjacent channel regions 43. The interconnecting channel region 48 is of substantially the same depth and width as that of the channel regions 43 and underlies one of the conductor members of the first plurality of conductor members 44. The function of the interconnecting channel region 48 is to provide a "turn-around" mechanism which permits surface charges moving in one channel region to be coupled to a next adjacent channel region. The need for such a turn-around mechanism can be more readily appreciated from the following description of the operation of the embodiment of our invention illustrated in FIG. 5.

Surface charges are moved in one direction along one channel region and in an opposite direction in an adjacent channel region by interconnecting alternately overlapping conductor members to a first voltage source which provides a wave shape 25 substantially similar to that illustrated in FIG. 3, and by connecting the remaining alternately overlapping conductor members to a voltage source which provides a voltage wave shape 26 similar to that illustrated in FIG. 3. The desirability of providing a turn-around mechanism is, in view of the foregoing, thus readily apparent. As the surface charge moves along one channel region, upon reaching the interconnecting channel region 48, the surface charge is coupled to the next adjacent channel region and the surface charge is now moving in an opposite direction. Thus, it is possible to construct long trains of storage elements with high density. Additionally, by virtue of the high density and close spacing between adjacent capacitive elements, surface charges are transferred from one location to another with clocking pulse rates in excess of one megacycle.

The advantageous high density features which our invention make possible can be more readily appreciated by considering the number of storage elements which can be fabricated on a square centimeter of semiconductor material. For example, by employing a first plurality of conductor members having individual widths of 15 microns with a 5 micron spacing between adjacent conductors and with the second plurality of conductor members overlapping the first plurality and having substantially similar dimensions, one may readily provide two capacitive storage elements in a 20 micron length along one channel region of the insulator layer. By making the channel regions approximately 5 microns wide and spaced from an adjacent channel region by 20 microns, approximately two storage elements in a 20 micron length or $4 \times 10^5$ storage elements per square centimeter are obtained. This high density storage array is a factor of ten times greater than present-day MOS field-effect transistor storage arrays and even a larger factor greater than bipolar transistor storage arrays. The aforementioned dimensions and spacings are well within the technological capabilities of photolithographic masking and etching techniques and pose no problem in fabrication. In fact, even higher density arrays of storage elements are achievable by these processes.

In addition to reducing the cost per storage element and increasing the speed of transferring information between storage elements, there is a substantial increase in the yield obtained by fabricating arrays of storage elements in accord with the above described embodiments of our invention.

The above description makes it readily apparent that storage and transfer of surface charges are provided by systematically interconnecting depletion regions formed under adjacent conductor members. In each of the above embodiments of our invention, this transfer has been effected by overlapping adjacent conductor members so that the depletion regions formed thereunder would contact each other. This method of storing and transferring charge may also be accomplished with a single layer of conductive members where highly accurate and precise patterning thereof is possible. For example, by spacing adjacent storage elements approximately 2.5 microns apart, it is possible to approach the same density achieved by the above described embodiments of our invention. These dimensions, however, approach the best resolution obtainable by photolithographic masking and etching techniques and generally result in patterns which are not precisely defined. Therefore, while such a configuration may be desirable, the present limitations on photolithographic masking and etching make such high density arrays very difficult to fabricate. In such non-overlapping arrangements of conductor members, the transfer of charge between adjacent depletion regions is slightly different from that of overlapping conductor members. In particular, as charge is transferred from one depletion region to another (in the non-overlapping arrangement of conductors), a potential barrier exists within the spacing or gap between adjacent conductor members whenever the field, created by the applied voltage, falls below a threshold field level at the semiconductor-insulator interface. This barrier impedes the transfer of charge sufficiently so that thermal activation and diffusion are required to effect a substantially complete charge transfer.

Thus, by way of illustrating yet another embodiment of our invention wherein even higher storage densities are obtained, reference is made to FIG. 7 of the drawing wherein a CIS storage apparatus 50 is illustrated in partial plan view as comprising a plurality of relatively thin channel regions 51*a*, 51*b*, 51*c* and 51*d* separated by relatively thick regions of insulator material 52*a*, 52*b* and 52*c*, respectively. Overlying and intersecting the regions of relatively thick and relatively thin insulator material is an array of conductor members 53 including a first group of members 53*a*, 53*c*, and 53*e* substantially parallel to each other and separated from each other by a second group of conductor members 53*b*, 53*d* and 53*f* forming a serpentine or zigzag pattern along their length. The pattern formed by this group of conductor members facilitates the movement of charge in one direction in one channel region and in another direction in an adjacent channel region as will be described hereinafter.

Referring now to FIG. 8 which is a cross-sectional view taken along the lines 1—1 of FIG. 7, the relationship between conductors of the first array 53 is more clearly illustrated. A second array of conductor members 54 including individual members 54*a*, 54*b* and 54*c* insulatingly overlie members of the first array. The array of conductor members 54 are substantially parallel with those of the array 53 and are illustrated as overlapping adjacent members of the array 53. More specifically, conductor member 54*a* overlaps adjacent conductors 53*a* and 53*b*, conductor 54*b* overlaps conductors 53*c* and 53*d*, etc.

FIG. 9, a partial cross-sectional view taken along the lines 2—2 of FIG. 7, illustrates the relationship between adjacent conductors of the array 53 and those of the array 54. In this FIGURE, however, conductor member 54*a* overlaps conductor members 53*b* and 53*c*, conductor member 54*b* overlaps conductor members 53*d* and 53*e*, etc.

In this embodiment of our invention, the spacing between adjacent conductor members of the first array in the region of the information storage channel is adjusted so that the depletion regions formed under each conductor member of array 53 overlap sufficiently so that the surface charge from one storage element may be transferred to an adjacent storage element by the overlapping depletion regions. In FIG. 8 for example, under appropriate combinations of voltage signals, a surface charge stored under conductor member 53*b*, for example, can be transferred to the storage location underlying conductor 53*c*. The transfer of surface charge from the storage location beneath conductor 53*c* to that underlying conductor 53*d* is achieved by applying an appropriate potential to conductor member 54*b*. Since the thickness of the insulator layer between conductor members of the second array is greater than that of the first array, it is necessary to apply a higher potential to the conductor members of the second array to achieve a depletion region of comparable depth to that achieved by the application of a voltage to conductor members of the first array.

If a three-phase clocking system (i.e., three signals of substantially the same frequency and wave shape but separated by 120 electrical degrees) of voltage signals $\phi_1$, $\phi_2$ and $\phi_3$ is applied to the conductor members of the first and second arrays in a manner illustrated in the drawing, surface charges are transferred from one storage cell location to an adjacent cell location. While the three-phase voltage signals may take various shapes, it is preferable that each phase has an amplitude-versus-time characteristic wherein a sufficiently high potential is attained to form a depletion region adequate to store the required charge for a period of time sufficiently long to overlap in time both the preceding phase and the following phase but which also falls to a sufficiently low potential for a portion of each cycle during which time no depletion region can exist under the corresponding conductor member. For example, if a surface charge exists under conductor member 54a of information storage channel 51b, it may be transferred to the next adjacent storage element by applying a voltage $\phi_1$ to conductor member 53c. By virtue of the spacing between conductor members 53c and 53d, upon application of a voltage $\phi_2$ to conductor member 53d, after the voltage pulse is removed from 53c the surface charge underlying 53c is transferred to 53d. This charge in turn can be transferred to the storage cell underlying conductor 54b by the application of a voltage $\phi_3$ to this conductor member. By repeating the sequence of applied voltages in the manner just described, that is, $\phi_1$, $\phi_2$ and then $\phi_3$, information stored in the form of surface charges is transferred from one location to another along the information storage channel. As illustrated in FIG. 7, in the next adjacent row of information storage elements, the phase relationship between adjacent closely spaced conductor members is reversed from those in row 2. As a result of this reversal, information in the form of surface charges is transferred in the opposite direction from that of row 2.

By providing a turn-around mechanism 55 similar to that described above with reference to FIG. 6, information in the form of surface charges travelling in one direction along an information storage channel can be redirected or made to travel in an opposite direction along the second channel. The mechanism by which the surface charge is redirected in this embodiment of the invention is substantially similar to that described above.

FIGS. 7 through 9 illustrate a particularly desirable feature of the embodiment of our invention; namely, that by appropriately adjusting the spacing between adjacent conductor members of the first array and the thickness of the insulator layer between the conductors of the second array and the semiconductor-insulator interface, we are able to employ a continuous conductive member, as opposed to individual conductive members. More specifically, since all conductive members of the second array are connected to the same voltage source, the second array of conductors are replaced with a continuous conductive member. In doing so, however, the spacing between adjacent conductor members of the first array and the thickness of the insulator layer are selected so that upon application of a voltage to the continuous conductor member and no voltages on the adjacent conductor members of the first array, field inversion does not occur between the adjacent conductors of the first array. Those skilled in the art can readily appreciate the various combinations of insulator layer thicknesses and spacings between adjacent conductor members are possible, depending upon the magnitude of the applied voltage to the continuous conductor member. Accordingly, any combination of dimensions which provides the desired results may be employed in practising our invention.

Although the above described embodiments of our invention illustrate adjacent information storage channels as moving stored information in opposite directions, it is to be understood that numerous other arrangements are contemplated. For example, several adjacent storage channels may be fabricated to move information in one direction followed by several storage channels moving information in a different direction.

FIG. 10 illustrates in cross-sectional view yet another embodiment of our invention, wherein a semiconductor substrate 59 is provided with an insulating layer 60 thereover and three layers of conductor members separated by insulator layers. The layers of conductor members are preferably formed by successively depositing a conductive material over an insulating layer and then photolithographically masking and etching the desired pattern of conductor members so as to form a first plurality of conductor members 61a, 61b and 61c in the first layer of conductive material and a second plurality of conductor members 62a, 62b and 62c and a third plurality of conductor members 63a, 63b and 63c, respectively, in the second and third layers of conductive material. The second plurality of conductor members overlap the first plurality and the third plurality overlaps the second plurality of conductor members so that the depletion regions formed under each overlapping conductor member contact an adjacent depletion region. The pattern of overlapping conductor members repeats with each group of three conductors. By employing a three-phase clocking system, similar to that described above with reference to FIG. 7, and with $\phi_1$ connected to the first plurality of conductor members, $\phi_2$ connected to the second plurality of conductor members and $\phi_3$ connected to the third plurality of conductor members, surface charges can be stored and transferred from one depletion region to another and in either direction merely by appropriately selecting the sequence of voltages applied to the various conductor members.

In this embodiment of our invention, as in previous embodiments where overlapping conductor members are employed, the speed with which surface charges are transferred is enhanced by the presence of the electric field.

The embodiment of our invention illustrated in FIG. 10 provides yet another arrangement whereby the need for close tolerances and precision masking and etching techniques are avoided. However, even where these problems are overcome, yet another problem still remains. The solution therefor is illustrated in partial plan view in FIG. 11 wherein in accord with another embodiment of our invention a plurality of interdigitated conductor members 71, 72 and 73, all formed in the same layer of conductive material, are respectively arranged over a plurality of information storage channels 74a, 74b and 74c, for example, formed in an insulator layer overlying a semiconductor material. The interdigitated members are arranged in such a way that every third member is connected to a common interconnecting electrical terminal. In FIG. 11 the common interconnecting terminals are illustrated and referred to by the numerals 75 and 76. In this way, a three-phase clocking system may be employed to transfer surface charges from one storage element to the next.

One of the problems encountered in forming such an interdigitated arrangement of conductors is the requirement that electrical crossovers between each set of three conductor members be provided for the three-phase clocking system signals. For example, conductor member 72 in the first set of three conductor members is connected to conductor member 72 of the second set of three conductor members, etc. Where high density arrays of storage elements are to be fabricated, the problem of interconnecting or interlacing appropriate interdigitated conductors is exceedingly difficult. In fact, the length of a crossover is generally larger than the length of the storage area itself. Accordingly, unless the crossover problem can be overcome, high density arrays of this type are not possible.

In accord with our invention, the crossover problem is overcome by alternating the crossovers from one side of the storage array to the other and thereby reduce the total length of the crossovers required by one-half. FIG. 11 illustrates these crossovers by the numeral 77. Contact to each crossover is provided by etching through an overlying insulator layer and depositing an interconnecting conductive layer, such as aluminum, over the insulator layer and patterning it by photolithographic masking and etching techniques to form an insulatingly overlying electrical terminal similar to terminals 75 and 76. A substantial increase in the density of storage elements is effected by this arrangement of crossovers.

While we have discussed numerous advantages associated with the embodiments of our invention described above, still other advantages of our invention will become apparent to those skilled in the art from the following description relating to certain methods which are particularly attractive for the fabrication of the above described embodiments of our invention.

As described above, the semiconductor substrate material may comprise silicon, germanium, or any of the Group III–V or II–VI semiconductor materials such as cadmium sulfide, gallium arsenide, and indium antimonide. The semiconductor materials are selected, doped and employed in such a manner that the time constants involved in the generation of minority carriers by the material itself are large compared to the information storage interval. The insulating layer overlying the semiconductor material may be silicon dioxide, silicon nitride, or any of the other useful insulating materials employed in the semiconductor technology. The insulating layer may, for example, be a thermally grown oxide of the semiconductor material or it may be deposited from a vapor phase deposition process. We have found, in practising our invention, the primary requirement which must be met is that of a uniformly continuous insulating film with substantially no imperfections therein. Silicon nitride films, for example, in excess of 200 A. and silicon dioxide in excess of about 500 A. are suitable in practising our invention. Conductor members formed over the insulator layer may be deposited metal layers substantially transparent to visible and longer wavelength radiation, if desired. The choice of material, however, depends primarily upon the manner in which minority carriers are to be introduced into the semiconductor material. For example, under circumstances in which it might be desirable to employ electromagnetic radiation, the choice of material depends primarily upon the wavelength of the selected incident light and the sensitivity of the semiconductor material employed. Therefore, it is to be understood that conducting media other than metallic layers may be utilized, such as layers of tin oxide, or doped semiconductor layers, such as silicon. Any of the generally accepted methods of depositing and etching conductive materials may be utilized in practising our invention. Reference may be made to our copending applications Ser. Nos. 675,225, 679,957 and 675,228, filed Oct. 13, 1967, and Ser. No. 725,825 filed May 1, 1968, and assigned to the same assignee of the present invention for greater details, if desired. After forming the conductive members by appropriately etching the conductive material, an insulator layer which may, for example, be similar to that described above, is formed over the etched conductor members. A second conductive material is then formed over the insulator layer and in accord with out invention, may or may not be etched, depending upon the particular configuration desired.

From the foregoing description of novel methods and apparatus for storing and transferring information within a semiconductor storage apparatus, it is evident that the previously stated objects are fulfilled. The CIS storage apparatus in accord with our invention, provides high density, high speed storage and transfer apparatus useful in information processing systems.

While our invention has been described with reference to certain embodiments, many modifications and variations will occur to those skilled in the art. Accordingly, by the appended claims, we intend to cover all such modifications and changes as fall within the true spirit and scope of our present invention.

What we claim as new and desire to secure by Letters Patent of the United States is:

1. Semiconductor apparatus comprising a substrate of substantially one conductivity type semiconductor material including a plurality of generally parallel channel portions adjacent a major surface thereof, an insulating layer overlying said major surface of said substrate, a first plurality of elongated conductor members electrically isolated from each other, overlying said insulating layer and said channel portions, and transversely disposed with respect to said channel portions, a second plurality of elongated conductor members insulatingly overlying said first plurality of conductor members and said channel portions, and transversely disposed with respect to said channel portions, each conductor member of said second plurality at least partially overlapping the conductors of a respective pair of adjacent conductor members of said first plurality over one of said channel portions and partially overlapping the conductors of a respective successive adjacent pair of conductor members of said first plurality over an adjacent one of said channel portions, successive pairs of said first plurality including a common conductor member, means for establishing adjoining depletion regions in each of said channel portions beneath said first plurality of conductor members and said second plurality of conductor members for the storage and transfer of charge along said channel portions.

2. The combination of claim 1 including means for connecting each conductor member of said first plurality with a respective adjacent conductor member of said second plurality.

3. The combination of claim 1 in which said first and second plurality of conductors are conductive strips insulatingly overlying each other and said substrate.

4. The semiconductor apparatus of claim 3 wherein said means for establishing depletion regions includes phase related voltage signals connected to said first and second plurality of conductive strips to cause depletion regions to be formed sequentially in one direction in one of said channel portions and sequentially in an opposite direction in said adjacent one of said channel portions.

5. The semiconductor apparatus of claim 4 wherein information in the form of electrical charges is transferred within said channel portions and including means for transferring said electrical charges from said one channel portion to said adjacent channel portion.

6. Semiconductor apparatus comprising a substrate of substantially one conductivity type semiconductor material including a plurality of generally parallel channel portions adjacent a major surface thereof, a first insulating layer overlying said major surface of said substrate, a first plurality of elongated conductor members electrically isolated from each other, overlying said insulating layer and said channel portion, and transversely disposed with respect to said channel portions, a second plurality of elongated conductor members insulatingly overlying said first plurality of conductor members and said channel portions, and transversely disposed with respect to said channel portions, each of said conductor members being consecutively numbered, said second plurality of elongated conductor members being spaced further from said substrate than said first plurality of elongated conductor members, said first plurality of conductor members including a first group of consecutively numbered conductor members and a second group of consecutively numbered conductor members, each conductor of said second group lying between a respective pair of adjacent conductor members of said first group, each of the conductor members of said second group spaced more closely to a respective odd numbered conductor member of said first group over one of said channel portions of said substrate and spaced more closely to a respective even numbered conductor member of said first group over an adjacent one of said channel portions of said substrate, each of the odd numbered conductor members of said second plurality overlying a respective odd numbered conductor member of said second group and an adjacent even numbered conductor member of said first group over said one channel portion and an adjacent odd numbered conductor member of said first group over said adjacent one of said channel portions of said substrate, each of the even numbered conductor members of said second plurality overlying a respective even numbered conductor member of said second group and an adjacent odd numbered conductor member of said first group over said one channel portion and an adjacent even numbered conductor member of said first group over said adjacent one of said channel portions of said substrate, means for establishing adjoining depletion regions in said channel portions beneath said first plurality of conductor members and said second plurality of conductor members for the storage and transfer of charge along said channel portions.

7. The semiconductor apparatus of claim 6 wherein said means for establishing depletion regions includes phase related signals connected to said first and second plurality of conductor members to cause depletion regions to be formed sequentially in one direction in one of said channel portions and sequentially in an opposite direction in said adjacent one of said channel portions.

8. The semiconductor apparatus of claim 7 wherein information in the form of electrical charges is transferred within said channel portions and in accord with said phase related signals and including means for transferring said electrical charges from said one channel portion to said adjacent channel portion.

9. Semiconductor apparatus comprising a substrate of substantially one conductivity type semiconductor material including a channel portion adjacent a major surface thereof, a first insulating layer overlying said major surface of said substrate, a first plurality of elongated conductor members electrically isolated from each other, overlying said insulating layer and said channel portion, and traversely disposed with respect to said channel portions, said first plurality of conductor members including a first group of consecutively numbered conductor members and a second group of consecutively numbered conductor members, each conductor of said second group lying between a respective pair of adjacent conductor members of said first group and being more closely spaced to an odd numbered one of said first group of conductor members than to an even numbered one thereof, a single conductor member insulatingly overlying said substrate and spaced a sufficient distance over said substrate in relation to the spacing between closely spaced conductor members of said first plurality as to be non-dominant with respect to charge transfer along said channel portion between said closely spaced conductor members of said first plurality, means for establishing adjoining depletion regions in said channel portion for the storage and transfer of charge therealong.

10. Semiconductor apparatus comprising a substrate of substantially one conductivity type semiconductor material including a channel portion adjacent a major surface thereof, an insulating layer overlying said major surface of said substrate, a first plurality of conductor members overlying said channel portion and electrically isolated from each other and from said channel portion of said substrate by said insulating layer, said insulating layer completely surrounding the conductor members of said first plurality over said channel portion, a second plurality of conductor members insulatingly overlying said first plurality of conductor members and said channel portion, each conductor member of said second plurality at least partially overlapping a respective conductor member of said first plurality, said insulating layer completely surrounding the conductor members of said second plurality over said channel portion, means for establishing adjoining depletion regions in said channel portion beneath said first and second plurality of conductor members for the storage and transfer of charge along said channel portion.

11. The combination of claim 10 in which is provided a third plurality of conductor members insulatingly overlying said second plurality of conductor members and said channel portion, each conductor member of said third plurality at least partially overlapping a respective pair of conductor members of said first and second plurality over said channel portion, and in which said depletion establishing means establishes adjoining depletion regions in said channel portion beneath said first, second and third plurality of conductor members for the storage and transfer of charge along said channel portion.

* * * * *